United States Patent
Chen et al.

(10) Patent No.: US 12,487,686 B2
(45) Date of Patent: Dec. 2, 2025

(54) SYSTEMS, METHODS, AND DEVICES INCLUDING OPTICAL OCCLUSION DETECTION

(71) Applicant: Apple Inc., Cupertino, CA (US)

(72) Inventors: Tong Chen, Fremont, CA (US); Xiaoyang Zhang, Singapore (SG); Christopher K. Ewy, San Francisco, CA (US); Ian P. Colahan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/818,476

(22) Filed: Aug. 28, 2024

(65) Prior Publication Data

US 2025/0110579 A1     Apr. 3, 2025

Related U.S. Application Data

(60) Provisional application No. 63/586,906, filed on Sep. 29, 2023.

(51) Int. Cl.
  *G06F 3/03*     (2006.01)
  *G06F 3/0354*   (2013.01)

(52) U.S. Cl.
  CPC ........ *G06F 3/0308* (2013.01); *G06F 3/03545* (2013.01)

(58) Field of Classification Search
  CPC ............. G06F 3/03545; G06F 3/03543; G06F 3/0346; G06F 3/04162; G06F 3/0383; G06F 2203/0384; G06F 3/0488; G06F 3/04883; G06F 2203/04101; G06F 3/038; G06F 3/033; G06F 3/017; G06F 1/1626; G06F 2200/1632; G06F 3/014; H03K 17/968; H03K 17/941; H03K 17/945; H03K 17/78; H03K 17/9631; A63F 13/533; A63F 13/25; A63F 13/00; G06V 10/761

See application file for complete search history.

(56) References Cited

U.S. PATENT DOCUMENTS

| | | |
|---|---|---|
| 6,305,851 B1 | 10/2001 | Stummer |
| 8,115,185 B2 | 2/2012 | Engstrand |
| 8,385,714 B2 | 2/2013 | Cummings et al. |
| 8,592,739 B2 | 11/2013 | McEldowney et al. |
| 8,612,856 B2 | 12/2013 | Hotelling et al. |
| 8,859,972 B2 | 10/2014 | Cummings et al. |
| 9,547,174 B2 | 1/2017 | Chunyu et al. |
| 10,073,541 B1 | 9/2018 | Baldwin |
| 10,440,240 B2 | 10/2019 | Osman |
| 11,314,321 B2 | 4/2022 | Steedly et al. |

(Continued)

FOREIGN PATENT DOCUMENTS

WO   WO-2018228143 A1 * 12/2018 ........... H03K 17/941

*Primary Examiner* — Sanjiv D. Patel
(74) *Attorney, Agent, or Firm* — Kubota & Basol LLP

(57) ABSTRACT

Present examples are directed to systems and methods for detecting local optical occlusion on a device. Examples are also directed to devices that may detect local optical occlusion. For example, a device may include a first light emitter and a first light detector, and the device may determine that the first light emitter of the device is optically occluded by an object outside a housing of the device based on a first amount of light of one or more amounts of light detected via the first light detector.

21 Claims, 8 Drawing Sheets

(56) References Cited

U.S. PATENT DOCUMENTS

| | | | |
|---|---|---|---|
| 2005/0030285 A1* | 2/2005 | Fu | G06F 3/03543 345/157 |
| 2013/0113705 A1* | 5/2013 | Gu | G06F 3/03543 345/166 |
| 2020/0201542 A1* | 6/2020 | Kumami | G06F 3/046 |
| 2024/0220033 A1* | 7/2024 | Sugahara | A61B 5/11 |
| 2024/0310930 A1* | 9/2024 | Yamamura | A61B 5/02427 |

* cited by examiner

SYSTEMS, METHODS, AND DEVICES INCLUDING OPTICAL OCCLUSION DETECTION

CROSS-REFERENCE TO RELATED APPLICATIONS

This application claims the benefit of U.S. Provisional Application No. 63/586,906, filed Sep. 29, 2023, the content of which is herein incorporated by reference in its entirety for all purposes.

FIELD OF THE DISCLOSURE

This relates generally to input devices, systems and methods, and more particularly to input devices, systems and methods including optical sensors.

BACKGROUND OF THE DISCLOSURE

Many types of input devices are presently available for performing operations in a computing system, such as buttons or keys, mice, trackballs, joysticks, touch panels, touch screens and the like. Some computing systems use handheld input devices such as a stylus or game controller.

SUMMARY OF THE DISCLOSURE

Spatial tracking of input devices (e.g., handheld input devices such as a remote game controller, stylus, or another type of input device) and of user interaction with handheld input devices are optionally used for inputs (e.g., to another computing system). However, spatial tracking techniques can be resource intensive. For example, one spatial tracking technique for a handheld input device, referred to herein as outside-in optical tracking, uses a constellation of light emitters (e.g., light emitting diodes (LEDs)) in the handheld input device that is driven. A computer system can capture (e.g., via one or more cameras) an image and determine the spatial location (e.g., up to six degrees of freedom posing) of the handheld input device using the captured light information (e.g., using the geometry of the constellation of the handheld input and/or the emitter wavelengths of the constellation of light emitters of the handheld input device). Such a method for spatial tracking can be resource intensive and/or wasteful of power, especially when the constellation of light emitters is driven independent of whether one or more light emitters of the constellation of light emitters are optically occluded and/or outside of the field of view of the one or more cameras of the computer system.

Indeed, one or more light emitters of the constellation of light emitters may in practice be locally optically occluded, for example, due to hand pose (e.g., one or more fingers and/or a palm of a user covering a portion of the handheld input device that includes the one or more emitters), a table, clothing, or bag covering the one or more light emitters, or another type of object. Though optically occluded and therefore unable to contribute to optical tracking, the driven one or more light emitters optionally still consume the power (e.g., when the constellation of light emitters are driven independent of whether one or more light emitters of the constellation of light emitters are optically occluded from visibility by the one or more cameras of a computing device).

As described herein, improved systems and methods for optical tracking detect and/or act upon detection of optical occlusion at a handheld input device. For example, the systems and methods described herein can increase synchronization of electronic devices in communication with the handheld input device, reduce power consumption (e.g., lowering a driving current demand and generation of heat) at the handheld input device. In particular, power consumption can be reduced by selectively driving one or more light emitter of a constellation of light emitters of the handheld input device in accordance with an understanding of whether one or more light emitters are optically occluded.

Present examples are directed to systems and methods for detecting local optical occlusion on a handheld input device and/or for smartly driving one or more light emitters of a constellation of light emitters of the handheld input device. In some examples, a method includes driving the one or more light emitters, detecting an amount of light via the one or more light detectors, and determining that a first light emitter of the one or more light emitters is optically occluded by an object outside a housing of the handheld electronic device based on the amount of light detected via the first light detector. In some examples, when the first light emitter is determined to be optically occluded, the method includes forgoes driving the light emitter at that location for outside-in tracking (or reduces the frequency or power of driving), while continuing driving the other light emitters that are not determined to be optically occluded, thus saving power for the handheld input device.

DETAILED DESCRIPTION

Figure 1:
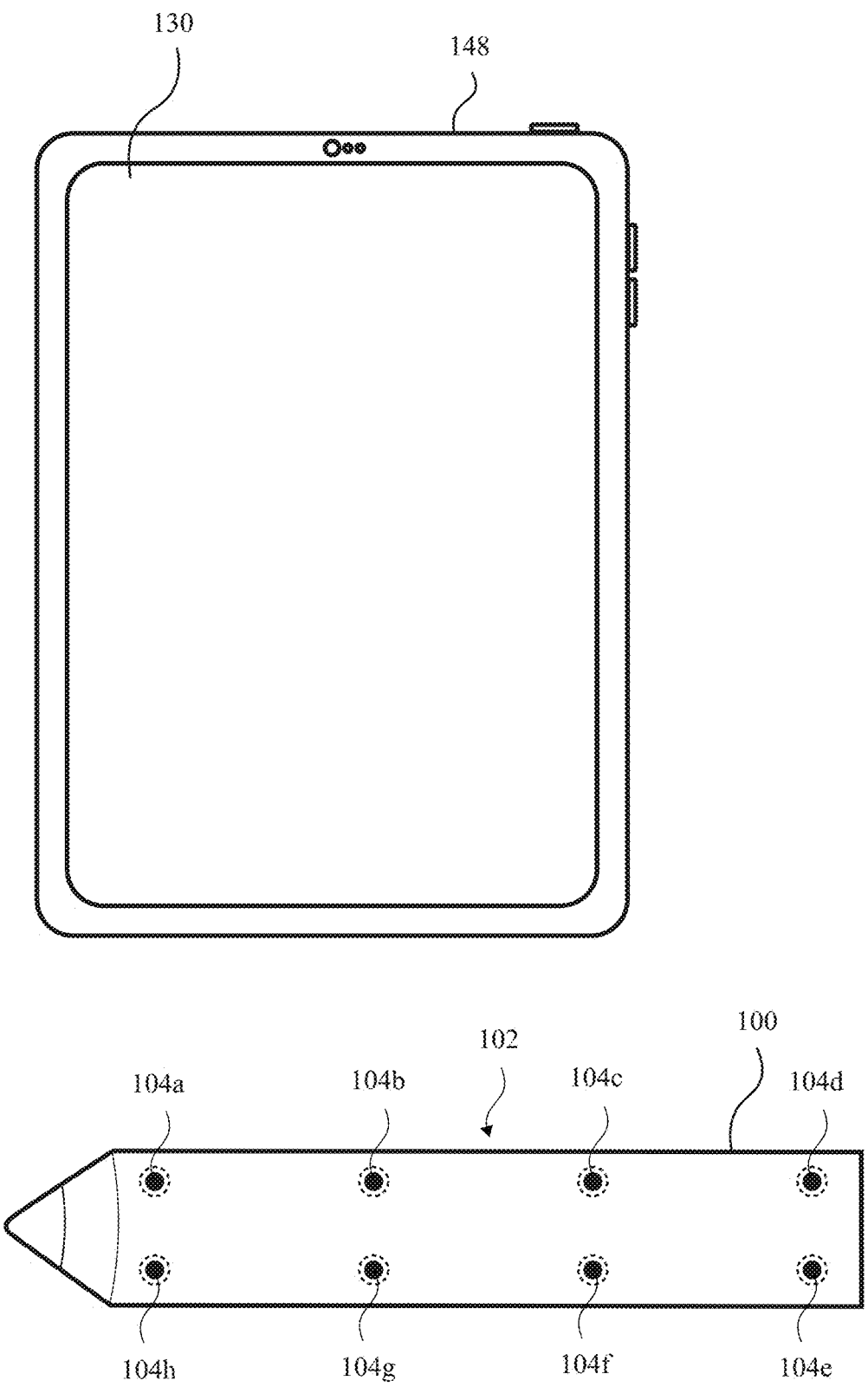
FIG. 1 illustrates a computing system that is in communication with an input device that includes local optical occlusion detection circuitry according to some examples of the disclosure.

In the following description of examples, reference is made to the accompanying drawings which form a part hereof, and in which it is shown by way of illustration specific examples that can be practiced. It is to be understood that other examples can be used, and structural changes can be made without departing from the scope of the disclosed examples.

Spatial tracking of input devices (e.g., handheld input devices such as a remote game controller, stylus, or another type of input device) and of user interaction with handheld input devices are optionally used for inputs (e.g., to another computing system). However, spatial tracking techniques can be resource intensive. For example, one spatial tracking technique for a handheld input device, referred to herein as outside-in optical tracking, uses a constellation of light emitters (e.g., light emitting diodes (LEDs)) in the handheld input device that is driven. A computer system can capture (e.g., via one or more cameras) an image and determine the spatial location (e.g., up to six degrees of freedom posing) of the handheld input device using the captured light information (e.g., using the geometry of the constellation of the handheld input and/or the emitter wavelengths of the constellation of light emitters of the handheld input device). Such a method for spatial tracking can be resource intensive and/or wasteful of power, especially when the constellation of light emitters is driven independent of whether one or more light emitters of the constellation of light emitters are optically occluded and/or outside of the field of view of the one or more cameras of the computer system.

Indeed, one or more light emitters of the constellation of light emitters may in practice be locally optically occluded, for example, due to hand pose (e.g., one or more fingers and/or a palm of a user covering a portion of the handheld input device that includes the one or more emitters), a table, clothing, or bag covering the one or more light emitters, or another type of object. Though optically occluded and therefore unable to contribute to optical tracking, the driven one or more light emitters optionally still consume the power (e.g., when the constellation of light emitters are driven independent of whether one or more light emitters of the constellation of light emitters are optically occluded from visibility by the one or more cameras of a computing device).

As described herein, improved systems and methods for optical tracking detect and/or act upon detection of optical occlusion at a handheld input device. For example, the systems and methods described herein can increase synchronization of electronic devices in communication with the handheld input device, reduce power consumption (e.g., lowering a driving current demand and generation of heat) at the handheld input device. In particular, power consumption can be reduced by selectively driving one or more light emitter of a constellation of light emitters of the handheld input device in accordance with an understanding of whether one or more light emitters are optically occluded.

Present examples are directed to systems and methods for detecting local optical occlusion on a handheld input device and/or for smartly driving one or more light emitters of a constellation of light emitters of the handheld input device. In some examples, a method includes driving the one or more light emitters, detecting an amount of light via the one or more light detectors, and determining that a first light emitter of the one or more light emitters is optically occluded by an object outside a housing of the handheld electronic device based on the amount of light detected via the first light detector. In some examples, when the first light emitter is determined to be optically occluded, the method includes forgoes driving the light emitter at that location for outside-in tracking (or reduces the frequency or power of driving), while continuing driving the other light emitters that are not determined to be optically occluded, thus saving power for the handheld input device.

FIG. 1 illustrates an example computing system 148 that is in communication with an input device 100 that includes local optical occlusion detection circuitry, according to some examples of the disclosure.

Example computing system 148 is optionally representative of a computer (e.g., a personal computer), a tablet, a game console (e.g., a video game console), a smart glass (e.g., smart glasses), a headset such as an extended reality (XR) headset, a mobile phone, a digital media player, a wearable device, a mobile or non-mobile computing device that includes a display, and/or another type of computing system. In some examples, example computing system 148 is an XR system including a head-mounted display for immersing a user of example computer system 148 into an augmented and/or virtual reality environment (e.g., a three-dimensional environment).

Input device 100 is optionally representative of a handheld input device (e.g., a game controller, a digital stylus, a digital pen, digital wand, digital ring, or another type of handheld input device). In some examples, input device 100 is configured to provide input to example computing system 148 during an XR experience. Input device 100 optionally includes a spatial tracking technology and/or is included in a spatial tracking system. For example, computing system 148 optionally tracks a position and/or orientation of input device 100, optionally relative to a three-dimensional environment and/or relative to a location of computing system 148 in a three-dimensional environment (e.g., using an outside-in tracking system).

In some examples, computing system 148 and input device 100 communicate with each other. For example, computing system 148 optionally detects input(s) from input device 100 and/or input device 100 optionally detects input(s) from computing system 148. In some examples, input device 100 is in communication with example computing system 148 via a wired connection. In some examples, input device 100 is in communication with example computing system 148 via a wireless connection. Although example computing system 148 illustrated in FIG. 1 includes touch screen 130, in some examples, example computing system 148 may additionally or alternatively have a non-touch sensitive display. Further, in some examples, example computing system 148 can accept input from input device 100, via touch screen 130. In some examples, computing system 148 does not accept input from input device 100 via a touch screen.

Input device 100 includes light emitters 104a-104h (e.g., a constellation of light emitters). In some examples, the geometry and/or wavelength of one or more or all light emitters 104a-104h is known by or made known to example computing system 148. In some examples, the example computing system 148 can spatially track input device 100 (e.g., relative to a physical environment and/or relative to example computing system 148) using detection of light emitted by these one or more light emitters by a camera of example computing system 148 (e.g., outside-in optical tracking).

In some examples, light emitters 104a-104h can be driven (e.g., independently, sequentially, and/or simultaneously) in a first mode and/or in a second mode. In the first mode of operation of a respective light emitter, the respective light emitter is driven for detection by example computing system 148 (e.g., outside-in optical tracking). In the second mode of operation of the respective light emitter, the respective light emitter is driven (e.g., independently, sequentially, and/or simultaneously) to detect whether the respective light emitter is being optically occluded on input device by an object outside of a housing of input device 100.

In some examples, input device 100 alternates between the first mode and the second mode of operation of light emitters 104a-104h. For example, input device optionally operates light emitters 104a-104h in the second mode to determine which light emitters are optically occluded. Then, based on that determination, input device 100 optionally triggers the first mode of operation for the light emitters that are not determined to be optically occluded, and optionally turns off the light emitters that are determined to be optically occluded while operating in the first mode of operation the light emitters that are not determined to be optically occluded. Thus, input device 100 optionally alternates between the first mode and the second mode. In some examples, input device 100 drives light emitters 104a-104h in the second mode at a different frequency. For example, input device 100 optionally drives light emitters in the second mode every $3^{rd}$, $5^{th}$, $8^{th}$ cycle of driving the light emitters, or another frequency.

In some examples, input device 100 operates a respective light emitter in the first mode or in the second mode. In accordance with a determination that the respective light emitter is not optically occluded when the respective light emitter is in the first mode, the respective light emitter continues operation in the first mode, and in accordance with a determination that the first respective light emitter is not optically occluded when the respective light emitter is in the second mode, the first respective light emitter continues operation in the second mode.

In some examples, a respective light emitter is driven in the second mode, and in response to a determination that the respective light emitter is not being optically occluded on input device by an object outside of a housing of input device, the respective light emitter is driven in the first mode. In some examples, a respective light emitter is driven in the second mode, and in response to a determination that the respective light emitter is being optically occluded on input device by an object outside of a housing of input device, the respective light emitter continues to be driven in the second mode, optionally with one or more different driving characteristics than the first mode, or ceases to be driven (e.g., at least temporarily). In some examples, local optical occlusion detection circuitry on input device is used to determine whether to drive the respective light emitter in the first mode or in the second mode.

In FIG. 1, light emitters 104a-104h are distributed in input device 100 in a first distribution arrangement. The arrangement and number of light emitters in FIG. 1 is representative (e.g., nonlimiting), and different arrangements are contemplated as within the scope of this disclosure. In FIG. 1, light emitters 104a-104h are optionally within input device 100 (e.g., within or inside a housing 102 of input device 100), though other arrangements are possible, such as an arrangement in which one or more light emitters are on a surface of input device 100 (e.g., coupled to a surface of input device 100 or outside of a housing of input device 100), or are not occluded by a housing of input device 100.

Figure 2:
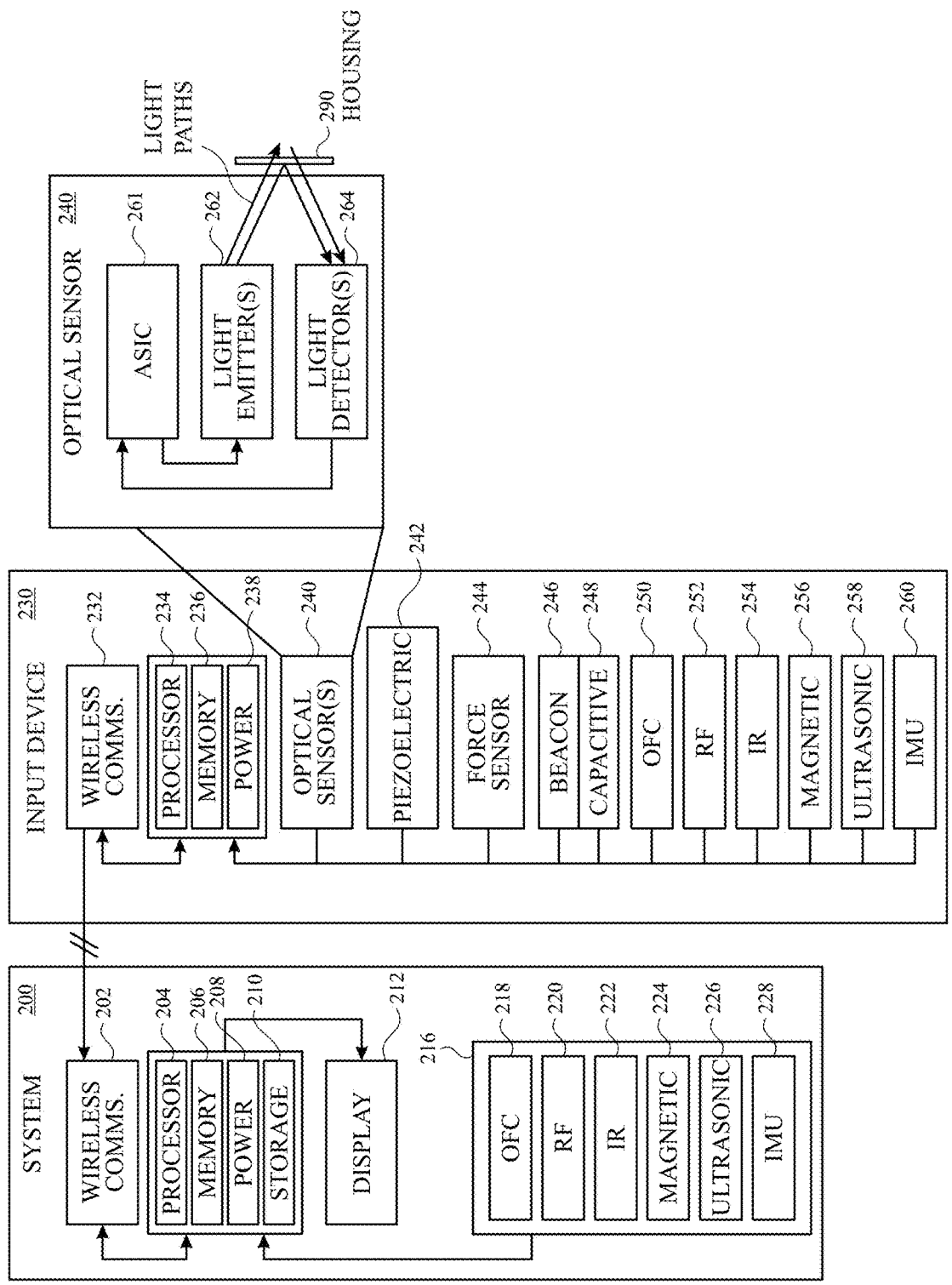
FIG. 2 illustrates a block diagram of a system including a computing system and an input device that includes local optical occlusion detection circuitry according to some examples of the disclosure.

FIG. 2 illustrates a block diagram of an example computing system 200 (which is optionally example computing system 148 of FIG. 1) and an example input device 230 (which is optionally input device 100 of FIG. 1), where the example input device 230 includes local optical occlusion detection circuitry, according to some examples of the disclosure.

In some examples, the computer system 200 can include a power source 208 (e.g., energy storage device such as a battery), host processor 204, program storage 210 and/or memory 206, wireless communication circuitry 202, and one or more sensing device(s) 216. The host processor 204 can control some or all of the operations of the computer system 200. The host processor 204 can communicate, either directly or indirectly, with some or all of the other components of the computer system 200. For example, a system bus or other communication mechanism can provide communication between the power source 208, the host processor 204, the display 212, the program storage 210, the memory 206, the wireless communication circuitry 202, and the sensing device(s) 216.

The host processor 204 can be implemented as any electronic device capable of processing, receiving, or transmitting data or instructions, whether such data or instructions is in the form of software or firmware or otherwise encoded. For example, the host processor 204 can include a microprocessor, a central processing unit (CPU), an application-specific integrated circuit (ASIC), a digital signal processor (DSP), a controller, or a combination of such devices. As described herein, the term "processor" or "processing circuitry" is meant to encompass a single processor or processing unit, multiple processors, multiple processing units, or other suitably configured computing element or elements. In some cases, host processor 204 can provide part or all of the processing systems or processors described with reference to any of FIGS. 3-9.

In some examples, the host processor 204 can perform actions in response to detecting inputs at or from input device 230. In some examples, the display 212 can be configured to display content generated using input device 230 (e.g., based on selection made at input device, and/or on selection that is based on a location or pointing direction of input device 230). For example, the host processor 204 can be connected to the program storage 210 (and/or memory 206) and a display controller/driver to generate images on the display 212. The display 212 optionally includes, Liquid Crystal Display (LCD) displays, Light-Emitting Diode (LED) displays, including Organic LED (OLED), Active-Matrix Organic LED (AMOLED), Passive-Matrix Organic LED (PMOLED) displays, a projector, a holographic projector, a retinal projector, or other suitable display. In some examples, the display driver can provide voltages on select (e.g., gate) lines to each pixel transistor and can provide data signals along data lines to these same transistors to control the pixel display image for the display 212.

The host processor 204 can cause a display image on the display 212, such as a display image of a user interface (UI) or display image of content generated using the input device 230, and can use touch processor and/or touch controller to detect a touch on or near the display 212, such as a touch input to the displayed UI when the computing system 200 includes a touch screen. The host processor 204 can also perform additional functions that may not be related to display or touch processing.

Note that one or more of the functions described in this disclosure can be performed by firmware stored in memory 206 and/or stored in program storage 210 and executed by the host processor 204 or other processing circuitry of the computing system 200. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, the program storage 210 and/or memory 206 can be a non-transitory computer readable storage medium. The non-transitory computer readable storage medium (or multiple thereof) can have stored therein instructions, which when executed by the host processor 204 or other processing circuitry, can cause the device including the computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, universal serial bus (USB) memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

The power source 208 can be implemented with any device capable of providing energy to the computing system 200. For example, the power source 208 can include one or more batteries (e.g., rechargeable batteries). Additionally or alternatively, the power source 208 can include a power connector or power cord that connects the computing system 200 to another power source, such as a wall outlet.

The memory 206 can store electronic data that can be used by computing system 200. For example, memory 206 can store electrical data or content such as, for example, audio and video files, documents and applications, device settings and user preferences, timing signals, control signals, and data structures or databases. The memory 206 can include any type of memory. By way of example, the memory 206 can include random access memory, read-only memory, Flash memory, removable memory, other types of storage elements, or combinations of such memory types.

Sensing device(s) 216 can include sensor circuitry configured to sense one or more types of parameters, such as but not limited to, vibration; light; touch; force; heat; movement; relative motion; biometric data (e.g., biological parameters) of a user; air quality; proximity; position; connectedness; and so on. In some examples, the sensing device(s) 216 can include an image sensor such as an outward facing camera 218, a radiofrequency sensor (and/or transmitter) 220, an infrared sensor (and/or transmitter) 222, a magnetic sensor (and/or generator) 224 (e.g., a magnetometer), an ultrasonic sensor (and/or transmitter) 226, and/or an inertial measurement unit 228. It should be understood that FIG. 2 illustrates some example sensors of sensing device(s) 216, but that the sensors are not so limited. In some examples, the sensing device(s) 216 can further include other sensor(s) including a force sensor, a heat sensor, a position sensor, a light or optical sensor, an accelerometer, a pressure transducer, a gyroscope, an acoustic sensor, a health monitoring sensor, and/or an air quality sensor, among other possibilities. Additionally, the one or more sensors of the sensing device(s) 216 can utilize any suitable sensing technology, including, but not limited to, interferometric, magnetic, capacitive, ultrasonic, resistive, optical, acoustic, piezoelectric, or thermal technologies.

Wireless communication circuitry 202 can transmit or receive data from another electronic device, such as from the input device 230. Although wireless communication circuitry 202 is illustrated and described, it is understood that other wired communication interfaces may be used. In some examples, the wireless and/or wired communications interfaces can include, but are not limited to, cellular, Bluetooth, and/or Wi-Fi communications interfaces. Although not shown, the computing system 200 can also include other input/output mechanisms including one or more touch sensing input surfaces, a crown, one or more physical buttons, one or more microphones or speakers, one or more ports such as a microphone port, and/or a keyboard.

The input device 230 of FIG. 2 can including a housing 290. Housing 290 is optionally transparent or at least partially transparent to one or more light emitter wavelengths (e.g., optionally a range of wavelengths). In some examples, the housing 290 includes a cylindrical body or another body shape optionally with a tip portion. In some examples, the tip portion can be part of a unibody housing and in some examples, the tip portion can be removable from the body. In some examples, the housing 290 of input device 230 can include a cylindrical body or another body shape optionally without a tip portion (e.g., opposite ends of the input device housing have similar appearances or dimensions). The housing 290 can include an ergonomic depression (or multiple ergonomic depressions), optionally as a guide for placement of one of a user's fingers (e.g., thumb or index finger). Input device 230 can be held by a user in different ways (e.g., a range of hand poses), as will be further described with reference to FIGS. 4A-4B. The ergonomic depression can optionally assist the user achieving a variety of poses and/or enable the user to provide additional inputs (e.g., to find a touch sensitive region with a particular finger).

The circuitry of the input device 230 can be disposed in the housing. For example, the circuitry can include a power source 238 (e.g., battery), processing circuitry (e.g., processor 234), memory 236, wireless communication circuitry 232, and various sensors. Note that one or more of the functions described in this disclosure can be performed by firmware stored in the memory 236 and executed by the processor 234 or other processing circuitry of the input device 230. The sensors of input device 230 can include optical sensors 240 among other possible sensors. In some examples, the optical sensors 240 are distributed in the input device 230. In some examples, input device 230 can include an outward facing camera 250, a beacon transmitter 246 (e.g., using any electromagnetic signals), an ultrasonic sensor (and/or transmitter) 258, a force sensor 244 (e.g., such as a strain gauge, capacitive-gap force sensor, a piezoelectric sensor 242), an inertial measurement unit (IMU) 260 (and/or other motion or orientation device such as an accelerometer or gyroscope), a capacitive electrode or other capacitive sensor 248, a radiofrequency sensor (and/or transmitter) 252, infrared sensor (and/or transmitter) 254, a magnetic sensor (and/or generator) 256, among other suitable sensors.

Processor 234 can communicate, either directly or indirectly, with some or all of the other components of the input device 230. For example, a system bus or other communication mechanism can provide communication between the various components of the input device 230. Processor 234 and/or memory 236 can be the same as or similar to processor 204 and/or memory 206, respectively.

As described herein, in some examples, motion, position, and/or orientation of the input device 230 can be tracked, optionally to generate input for the computing system 200. In some examples, motion, position, and/or orientation of the input device 230 can be tracked using optical sensors 240, optionally in additional to sensors of computing system 200. For example, the input device 230 can include a single optical sensor 240 or a plurality of optical sensors 240 that can be utilized in spatial tracking of input device 230 (e.g., outside-in optical tracking). Further, the single or plurality of optical sensors 240 can be used to estimate a hand pose of a user of input device 230. The optical sensor(s) 240 can be configured to both transmit and receive light (e.g., emitting and receiving infrared light), which can provide data about the motion, position, and/or orientation of the input device (and optionally of specific portions of input device) relative to computing system 200, and further about whether one or more light emitters of input device 230 are optically occluded by an object outside of housing 290.

In some examples, tracking the motion, position, and/or orientation of the input device 230 using the optical sensor(s) 240 can be augmented with additional sensors. For example, the sensing device(s) 216 and or the various sensors of the input device 230 can track information about the input device 230 (e.g., position, motion, orientation, force, etc. of the input device) and the information can be transferred from the one or more sensing device(s) 216 to the host processor 204. The information from the input device 230 (e.g., received via wireless communication circuitry 202, 232) and the one or more sensing device(s) 216 can be stored in memory 206, in some examples. The information can be processed by host processor 204 to render and/or display content on the display 212 from the input device 230 (e.g., rendering writing or drawing on the display in response to selection and/or movement of input device 230 in free-space (e.g., without input device contacting a surface, generating content in response to detecting input device 230 being pointed in one or more directions relative to computing system 200 and/or relative to a user interface displayed by computing system 200). In some examples, the information about the input device 230 can be gathered by, transferred to, processed by and/or stored on the input device. For example, one or more sensing modalities within the input device 230 can provide additional information about input device force, orientation, motion, and/or position. The combined information from the optical sensors 240 and the one or more sensing modalities can then be transferred to, processed by, and/or stored on a computing device to provide inputs computing system 200 and/or to render and/or display content on the display 212 according to examples of the disclosure. In some examples, computing system 200 can render content in a three-dimensional environment based on position and/or motion of an input device. For example, computing system 200 can be a head-mounted XR headset that can render and overlay content over a real-world environment or a representation of a real-world environment captured by outward facing cameras 218.

In some examples, each optical sensor 240 includes an application-specific integrated circuit (ASIC) 261, light emitter(s) 262 (e.g., light emitter(s) 104a-104h), and/or one or more light detector(s) 264. In some examples, input device 230 includes a single ASIC for the local optical occlusion detection circuitry. For example, ASIC 261 is optionally configured to include local optical occlusion detection circuitry for multiple light emitter/light detector pairs for detecting optical occlusion of light emitters(s) 262 (e.g., light emitters 104a-104h of FIG. 1). In some examples, input device includes multiple ASICs for the local optical occlusion detection circuitry. For example, each ASIC is optionally assigned to a subset of the multiple light emitter/light detector pairs (e.g., on ASIC per separate light emitter/light detector pair).

Housing 290 is optionally at least partially transparent to light emitter wavelengths. For example, light emitter(s) 262 optionally emit light that is incident on housing 290, and some of the light is received (e.g., via reflection) into light detector(s) 264. Some of the light is transmitted at and/or through housing 290 and then is reflected back into light detector(s) 264. Some of the light is transmitted through housing 290 and is not reflected back into light detectors(s) 264 when not occluded by an object outside the housing. Light detector(s) 264 are optionally configured to detect ambient light, optionally in addition to light from light emitter(s) 262, at the same time or at different times. In some examples, light detector(s) 264 can detect ambient visible light and detect non-visible light for occlusion detection related to tracking when both occur at the same or partially overlapping times. In some examples, light emitter(s) 262 emit visible light for tracking. In some examples, when light emitter(s) 262 emit visible light for tracking, a duty cycle is below a threshold duty cycle for visibility of the visible light to the naked human eye. In some examples, the light emitter(s) 262 can include a light-emitting diode (LED) or a vertical-cavity surface-emitting laser (VCSEL). In some examples, the light detector(s) 264 can include an image sensor. Further, the optical sensor 240 optionally includes a lens or a lens array.

It should be apparent that the architecture shown in FIG. 2 is only one example architecture of the computing system 200, the input device 230, and the optical sensor 240 and that the system could have more or fewer components than shown, or a different configuration of components. The various components shown in FIG. 2 can be implemented in hardware, software, firmware, or any combination thereof, including one or more signal processing and/or application specific integrated circuits.

Figure 3A:
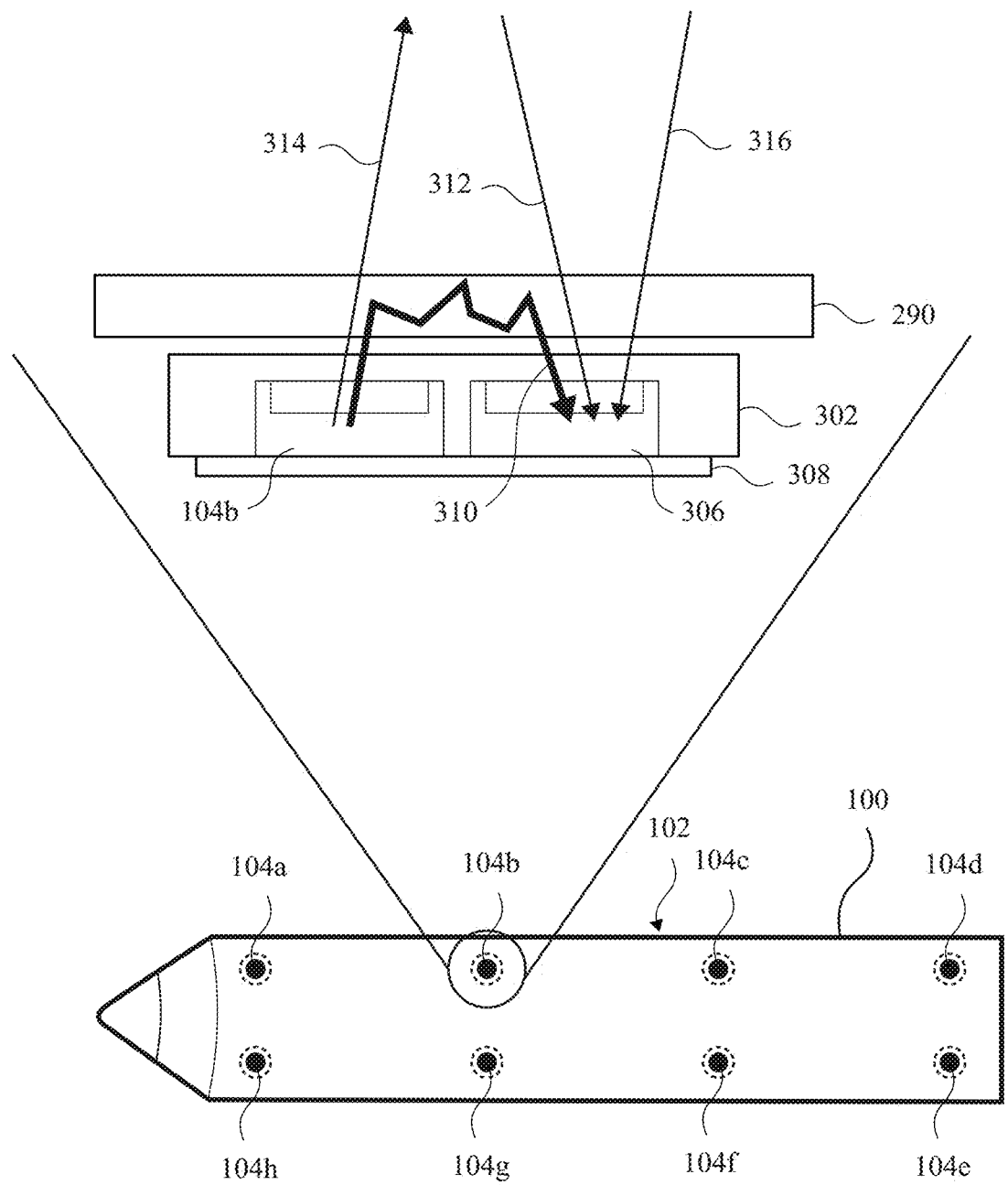
FIG. 3A illustrates an optical module on an input device that includes a light emitter and a light detector that can be utilized by local optical occlusion detection circuitry according to some examples of the disclosure.

FIG. 3A illustrates an optical module 302 of input device 100 that includes light emitter 104b and a light detector 306 (hereinafter also called PD 306) that can be utilized by local optical occlusion detection circuitry according to some examples of the disclosure.

In FIG. 3A, optical module 302 includes light emitter 104b (e.g., an infrared emitting LED) and a photodiode (PD) 306. In FIG. 3A, light emitter 104b and PD 306 are both below housing 290 of input device 100, and are optionally at a given lateral distance from each other. It should be noted that light emitter 104b and PD 306 can be interior components (e.g., within or below housing 290 in the orientation shown in FIG. 3), exterior components on a surface of housing 290, or embedded with housing 290. In some examples, light emitter 104b and PD 306 are arranged differently in optical module 302. In some examples, light emitter 104b and PD 306 are not in the same optical module, but are in different optical modules. In some examples, light emitter 104b and/or PD 306 includes lens/lens arrays and/or other features. In some examples, the PD 306 includes a complementary metal-oxide semiconductor (CMOS) image sensor or a single photon avalanche detector (SPAD) array. PD 306 is optionally configured to detect light emitted by light emitter 104*b*. For example, PD 306 is optionally configured to detect the wavelength of light emitted by light emitter 104*b*, which is optionally infrared. PD 306 optionally detects ambient light, optionally in addition to light from light emitter 104*b*.

In FIG. 3A, in response to driving light emitter 104*b*, light is emitted from light emitter 104*b*. Some of the light emitted from light emitter 104*b* is reflected into PD 306. In FIG. 3A, light path 310 is representative of a baseline signal detected at PD 306 that is not due to light reflection from an object outside of a housing 290 of input device, but is optionally due to crosstalk (e.g., light that is optionally reflected into PD 306 due to internal characteristics and not due to reflected from an outside object). Light path 314 corresponds to light that is emitted from light emitter 104*b* that exits the housing 290 of input device 100. Light path 312 correspond to light emitted from light emitter 104*b* that is reflected back to PD 306 due an object outside of housing 290 (e.g., due to being incident of a surface of object outside of housing 290 and within a threshold distance (e.g., 1 mm, 2 mm, 4 mm, 5 mm, 1 cm, 1.5 cm, 2 cm, 3 cm, or another distance from the housing of input device) that reflects the light back to the housing 290). It should be noted that PD 306 optionally receives ambient light 316 (e.g., light that is sourced outside of input device 100, optionally assuming sufficient transparency of the housing 290 to be sensitive to ambient light).

In some examples, optical module 302 includes one or more additional or alternative light emitters that are not driven for detection by example computing system 148; these additional or alternative light emitters are optionally driven to emit light of specific wavelengths that are sensitive to specific types of objects (e.g., skin) that are reflective to the specific wavelengths, such as the light-based proximity sensor described in U.S. Pat. No. 11,109,136, which is incorporated by reference herein. Further, other light emitters and/or light sensors can be used for proximity sensing or ranging for sensing or ranging an outside object or for laser pointer/flashlight functionality (or another type of light emitter/sensor functionality), without being configured for spatial tracking.

It should be noted that, in some examples, each of light emitters 104*a*-104*h* is paired with a respective, single light detector. In some examples, one or more light emitters 104*a*-104*h* is associated with more than one light detector. Similarly, the relative distance between light emitter 104*b* and PD 306 and relative placement of light emitter 104*b* and PD 306 in FIG. 3A is representative (e.g., nonlimiting), and other distances and/or relative placements are contemplated as within the scope of this disclosure. In some examples, the light emitters and the light detectors of the input device used for local optical occlusion detection are equal in number. In some examples, the light emitters and the light detectors of the input device used for local optical occlusion detection are unequal in number. For example, a light emitter is optionally paired with one or more light detectors. As another example, a light detector is optionally paired with one or more light emitters.

Figure 3B:
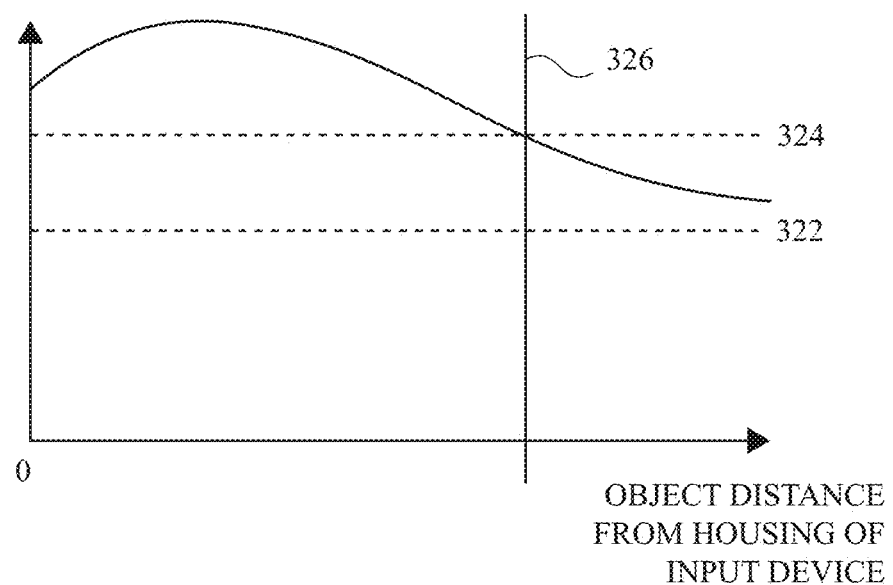
FIG. 3B illustrates an example graph of an amount of light detected at a light detector of an input device as a function of a distance of an object outside the housing of the input device in response to light emitted by a light emitter of the input device according to some examples of the disclosure.

FIG. 3B illustrates an example graph 320 of an amount of light detected at PD 306 as a function of a distance of an object outside the housing of input device (and optionally intersecting a light path corresponding to light emitted from light emitter 104*b*) in response to light emission from light emitter 104*b*, according to some examples of the disclosure.

In FIG. 3B, line 322 corresponds to an amount of light detected at PD 306 that is due to crosstalk (e.g., reflected by or in the housing, not exiting the housing to the outside environment), such as light path 310 of FIG. 3A described above, and line 324 corresponds to a threshold amount of light detected at PD 306 above which local optical occlusion detection circuitry on input device 100 determines that light emitter 104*b* is optically occluded by an object outside the housing of input device 100. In some examples, line 324 is modulated based on ambient light level. For example, in accordance with a determination that an ambient light level is a first amount (e.g., in response to detecting that an ambient light level is a first amount), the threshold at which local optical occlusion detection is triggered is a first amount, and in accordance with a determination that an ambient light level is a second amount, greater than the first amount, the threshold at which local optical occlusion detection is triggered is a second amount greater than the first amount.

As shown in example graph 320, as the distance of the object (e.g., finger, table, and/or another object that is reflective to emitter wavelength) to the housing of input device 100 decreases, the amount of light that enters PD 306 exceeds a threshold amount of light. In accordance with a determination that the amount of light that enter PD 306 exceeds the threshold, input device 100 (e.g., optical occlusion detection circuitry on input device) optionally determines that light emitter 104*b* is locally optically occluded by an object outside the housing of input device. Line 326 optionally defines the threshold distance of the outside object at which the light emitter is determined to be optically occluded by the outside object. It should be noted that in the illustrated example, local optical occlusion is detected by input device while the object is not in contact with the housing of input device (e.g., the object is 1 mm, 2 mm, 4 mm, 5 mm, 1 cm, 1.5 cm, 2 cm, 3 cm, or another threshold distance from the housing of input device). As such, input device can detect local optical occlusion at input device due to objects that are not necessarily in contact with input device, in addition to outside object that are in contact with input device.

In some examples, input device initiates local optical occlusion detection circuitry when input device is activated (e.g., not when the input device is off, unpaired from the computer system, or disactivated) and/or being held (e.g., held by the user or is not stationary for a threshold period of time (e.g., 0.2 s, 0.5 s, 1 s, 3 s, 5 s, 12 s, or another threshold period of time). In some examples, input device initiates local optical occlusion detection in response to input from computing system 200 (e.g., communicated via wired or wireless communication therebetween). For example, computing system 200 optionally includes one or more cameras that detects that input device is being held by a user and then computing system 200 transmits to input device a request to initiates local optical occlusion detection and/or to generate the light constellation for spatial tracking.

Figure 4A:
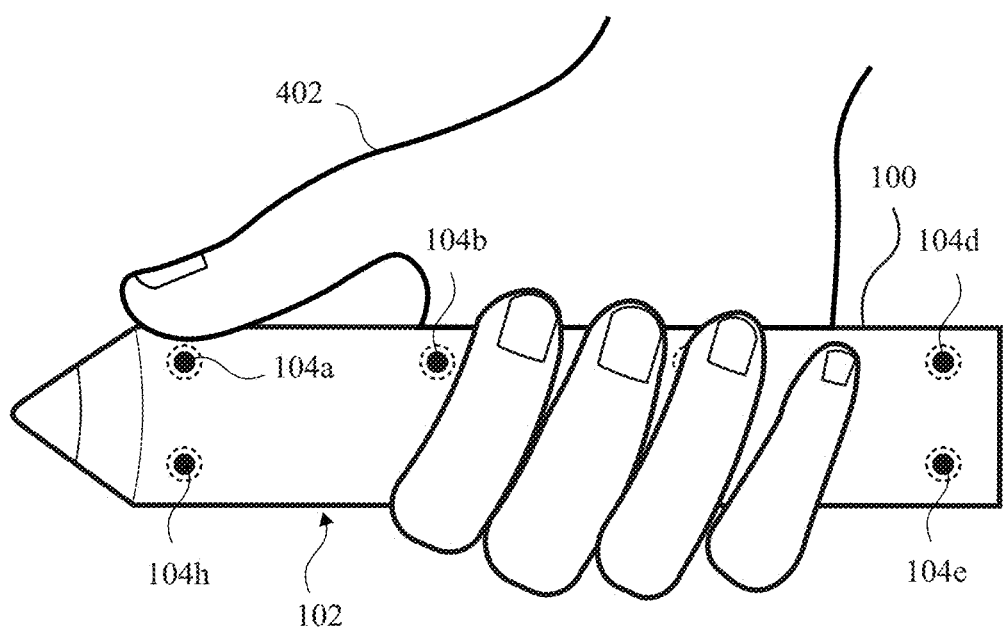
FIGS. 4A-4B illustrate an input device that includes local optical occlusion detection circuitry held by a user in first and second hand poses.
Figure 5A:
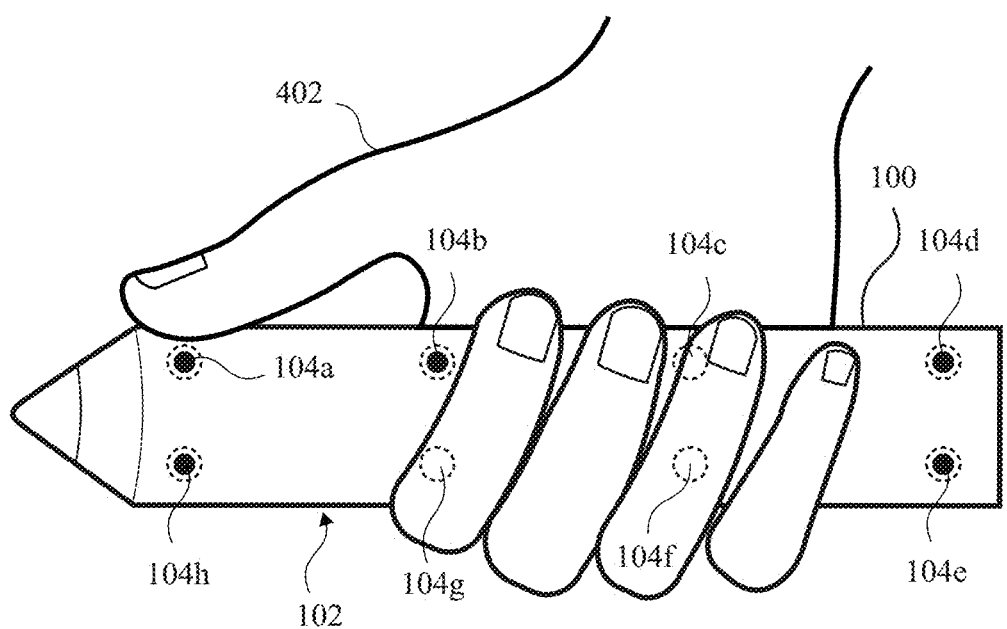
FIGS. 5A-5B illustrate light emitters of an input device used for tracking of input device, including light emitters that are or are not optically occluded due to an outside object according to examples of the disclosure.

In FIG. 4A, input device 100 has optionally initiated local optical occlusion detection circuitry, optionally in response to input from computing system 200 indicating that input device is held in a hand 402 of a user. In response to the initiation, input device 100 optionally operates optical module in a second mode (e.g., a sniff mode) to detect whether any of light emitter 104*a*-104*h* are being optically occluded on the handheld input device. For example, input device 100 optionally drives, simultaneously or sequentially, light emitters 104*a*-104*h* at a lower power for the second mode compared with a power for spatial tracking (e.g., outside-in optical tracking) in the first mode. A respective PD of input device 100 optionally captures light from a respective light emitter, and input device 100 optionally sends to the optical occlusion sensing circuitry the captured light data corresponding to the respective PD of input device 100. When input device 100 determines that local optical occlusion is present based on the captured light data corresponding to the respective PD of input device 100, input device 100 optionally forgoes driving (e.g., forgoes driving for outside-in optical tracking) the light emitter(s) that corresponds to the respective PD or maintains operation of the light emitter(s) in the lower powered mode, thus saving power on input device 100. For example, in FIG. 4A, the hand 402 of the user holding input device 100 optically occludes light from light emitters at specific locations relative to input device 100 (e.g., at locations where the hand 402 is covering input device 100). Input device 100 optionally determines that local optical occlusion is present on input device 100, and optionally forgoes driving (e.g., forgoes driving for outside-in optical tracking) the occluded light emitters which are determined to be locally optically occluded based on the data from the respective PDs, such as shown in FIG. 5A, and optionally drives light emitters 104a, 104b, 104d, 104h, and 104e in optical tracking mode, as these light emitters are not optically occluded. In FIG. 5A, light emitters 104c, 104f, and 104g are optically occluded by an outside object (e.g., fingers of the hand 402 in FIG. 5A which is in same hand pose as in FIG. 4A) and are optionally driven at a different duty cycle or intensity that is lower than the duty cycle or intensity of the non-occluded light emitters 104a, 104b, 104d, 104h, and 104c.

In addition, input device optionally estimates a hand pose using the occlusion information. For example, input device optionally operates in the second mode light emitters 104a-104h to determine which light emitters are being optically occluded at input device and then aggregates the occlusion information corresponding to the occluded light emitters to determine how the user is holding input device.

Figure 4B:
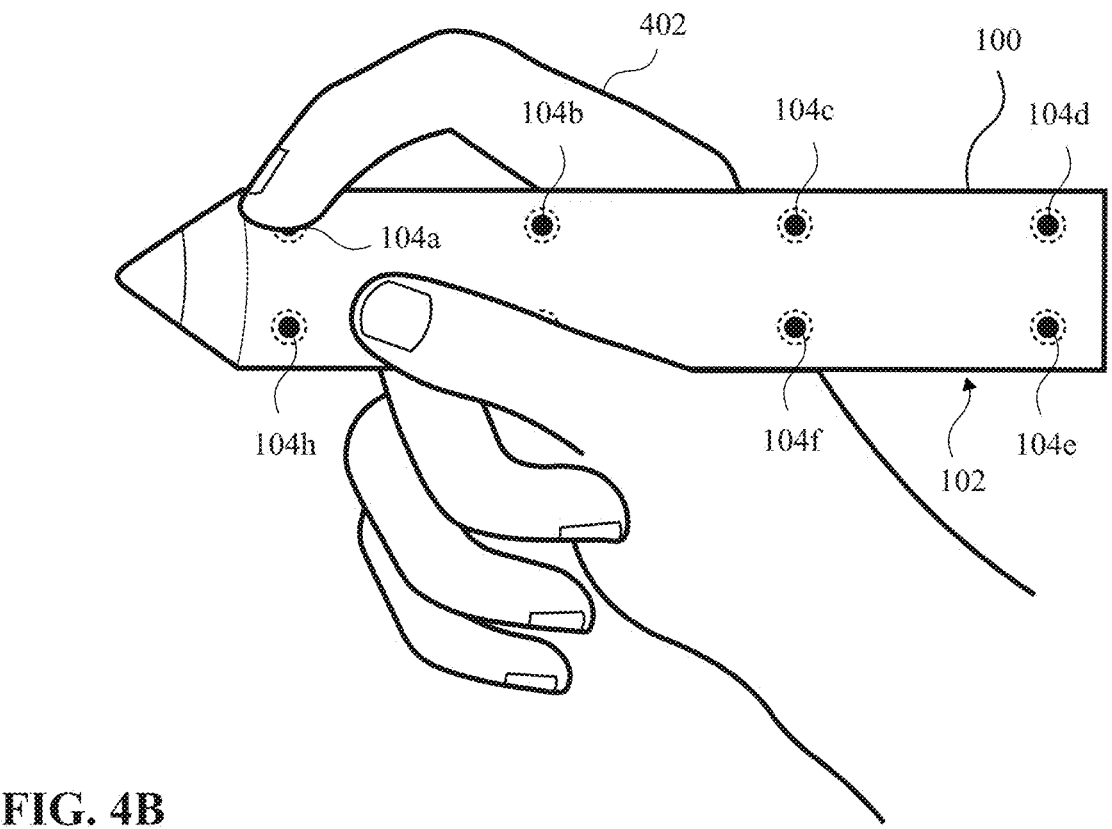
Figure 5B:
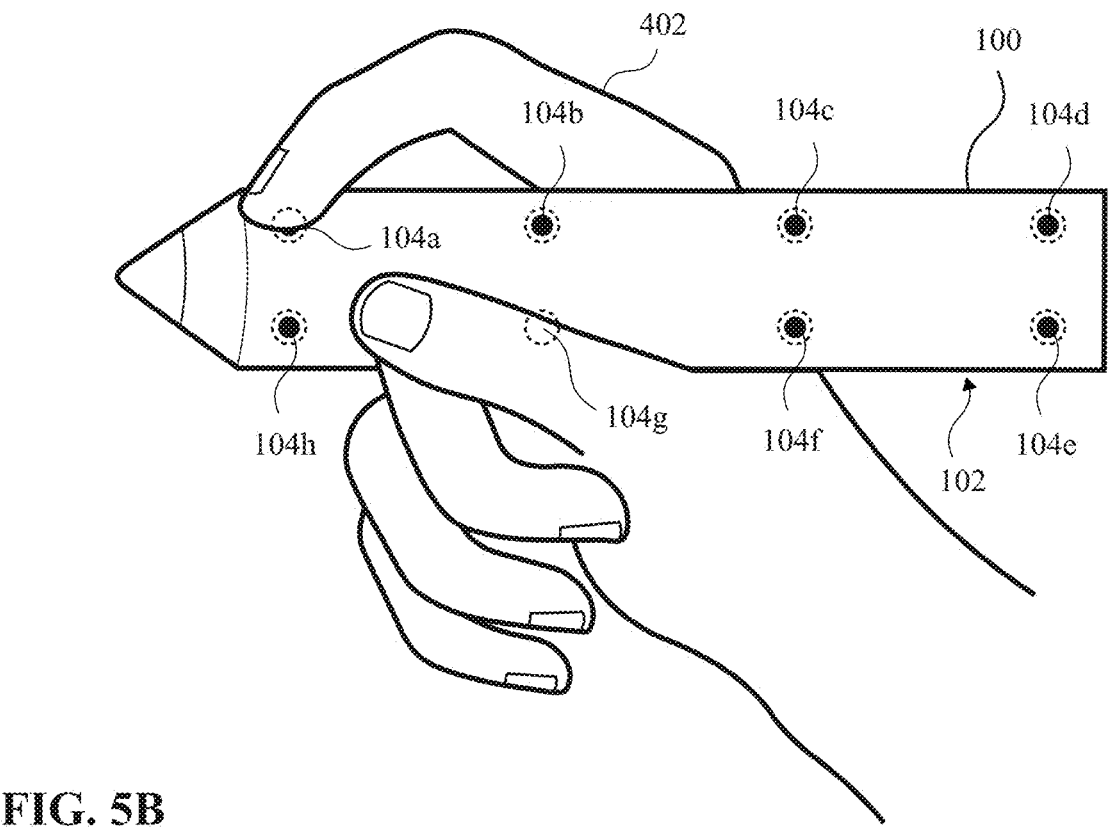

FIGS. 4B and 5B illustrate another example of smart constellation driving for tracking of input device 100. In FIG. 4B, input device 100 has optionally initiated local optical occlusion detection circuitry, optionally in response to input from computing system 200 indicating that input device is held in a hand of a user. In response to the initiation, input device optionally operates optical module in a second mode (e.g., a sniff mode) to detect whether any of light emitter 104a-104h are being optically occluded on the handheld input device. For example, input device optionally drives, simultaneously or sequentially, light emitters 104a-104h at a lower power for the second mode compared with a power for spatial tracking (e.g., outside-in optical tracking). A respective PDs of input device 100 optionally captures light from the light emitters, and input device 100 optionally sends to the optical occlusion sensing circuitry the captured light data corresponding to the respective PD of input device 100. When input device determines that local optical occlusion is present based on the captured light data corresponding to the respective PD of input device 100, input device 100 optionally forgoes driving (e.g., forgoes driving for outside-in optical tracking) the light emitter(s) that corresponds to the respective PD or maintains operation of the light emitter in the lower powered mode, thus saving power on input device 100. For example, in FIG. 4B, the hand 402 of the user holding input device occludes light from some light emitters at specific locations relative to input device 100 (e.g., at locations where the hand 402 is covering input device 100). Input device 100 optionally determines that local optical occlusion is present on input device 100, and optionally forgoes driving (e.g., forgoes driving for outside-in optical tracking) the light emitters that are determined to be locally optically occluded based on the data from the respective PDs, such as shown in FIG. 5B, and optionally drives light emitters 104b-104f and 104h in optical tracking mode, as these light emitters are not optically occluded. In FIG. 5B, light emitters 104a and 104g are optically occluded by an outside object (e.g., fingers of the hand 402 in FIG. 5B which is in same hand pose as in FIG. 4B) and are optionally driven at a different duty cycle or intensity that is lower than the duty cycle or intensity of the non-occluded light emitters 104b-104f and 104h.

In addition, input device optionally estimates a hand pose using the occlusion information. For example, input device optionally operates in the second mode light emitters 104a-104h to determine which light emitters are being optically occluded at input device and then aggregates the occlusion information corresponding to the occluded light emitters to determine how the user is holding input device.

In some examples, light emitters can dynamically enter or exit outside-in tracking mode based on pose of hand irrespective whether the light emitters are locally optically occluded. For example, while input device 100 is being held in a first hand pose, one or more light emitters are optionally facing away from and not visible to a camera of computing system 200 that is involve in outside-in optical tracking of the input device, and operating these light emitters that are not visible to the camera in the spatial tracking mode may waste power. Thus, in some examples, when input device 100 is not visible to the computer system (even though the light emitters of the input device do not have a local occlusion from an object within a detection distance from the light emitters), the input device optionally forgoes driving the light emitters in the outside-in tracking mode of operation. When the one or more light emitters are not facing away from and/or are visible to the camera of computing system 200, the light emitters can be driven. In some examples, even when the light emitters are facing away from the camera of computing system 200, the light emitters are optionally not driven regardless of whether they are optically occluded by an outside object within a threshold distance of input device 100.

Sometimes, a user changes hand poses while operating input device. When the user changes hand poses, different light emitters optionally become optically occluded while other light emitters optionally become non-optically occluded. For example, when hand 402 is in the pose shown in FIG. 5A, light emitter 104a is not optically occluded and thus is optionally driven for spatial tracking of input device (e.g., outside-in optical tracking), and when hand 402 is in the pose shown in FIG. 5B, light emitter 104a is optically occluded and thus is optionally not driven for spatial track of input device, but rather in a second mode that is different from the spatial tracking mode and is optionally lower in power consumption than the spatial tracking mode of the light emitter 104a. Thus, input device 100 optionally dynamically updates the mode of operation of a respective light emitter based on whether the respective light emitter is determined to be optically occluded by an outside object.

Figure 6:
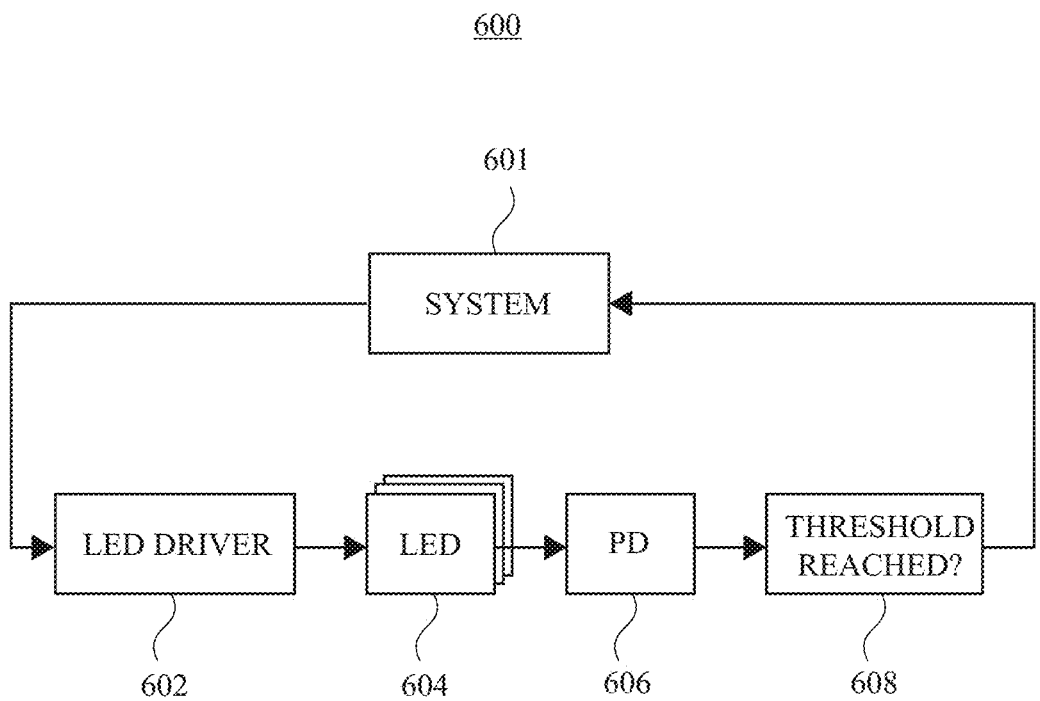
FIG. 6 illustrates a block diagram of an input device including one or more light emitters and one or more optical detectors according to some examples of the disclosure.

FIG. 6 illustrates a block diagram 600 of an optical occlusion detection system 601 according to some examples of the disclosure. The optical occlusion detection system 601 includes driving circuitry 602 for driving one or more light emitters 604 (e.g., light emitters 104a-104h of FIG. 1), optionally in a second mode of operation in which the light emitters are driven at a first duty cycle and intensity. The second duty cycle and intensity are optionally lower than a second duty cycle and intensity corresponding to a first mode of operation in which the light emitters are driven for spatial tracking (e.g., outside-in optical tracking) of input device 100. In response to light emission from the one or more light emitters, some light from the one or more light emitters goes through a housing of input device, exits the housing of input device 100 and is reflected back into the housing of input device via a reflective object, such as a finger or another type of object, and then exits the housing of input device into PD 606. It should be noted that PD 606 optionally detects light from multiple light emitters and is optionally used to determine whether one or more of the multiple light emitters are locally optically occluded by one or more objects outside the housing of input device. Optical occlusion detection system 601 also includes, at block 608, local optical occlusion detection circuitry that receives captured light data from a respective PD, and compares the light data to a threshold, such as the occlusion threshold of FIG. 3B. In response to determining that the light data exceeds the threshold, the system optionally determines that the light emitter is optically occluded by an object outside of the housing of the input device, and optionally forgoes driving with the first duty cycle and intensity that is higher than the second duty cycle and intensity. In response to determining that the light data does not exceed the threshold, such as the occlusion threshold of FIG. 3B, the system optionally determines that the light emitter is not optically occluded by an object outside of the housing, and optionally, initiates a process to drive the light emitter that is not optically occluded at a duty cycle or intensity that is higher than the second duty cycle or intensity.

Figure 7:
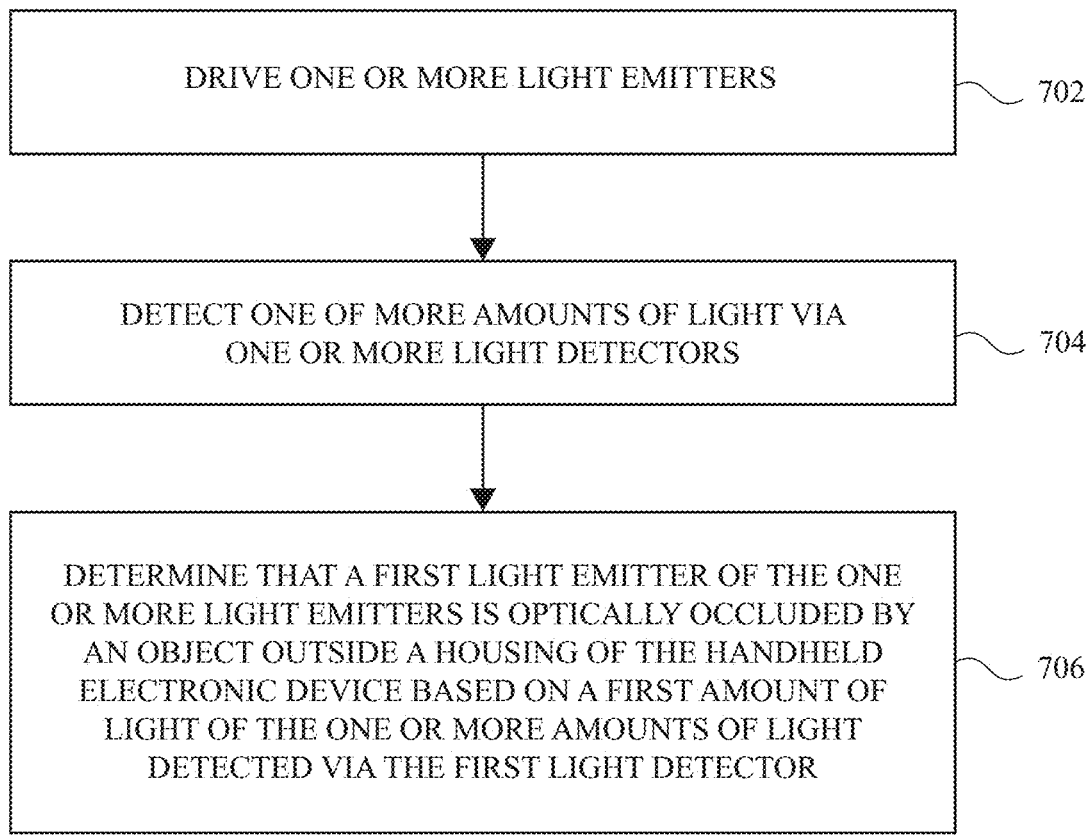
FIG. 7 illustrates a flowchart of a method for detecting local optical occlusion for an input device according to some examples of the disclosure.

FIG. 7 illustrates a flowchart of a method 700 for detecting local optical occlusion on an input device, according to some examples of the disclosure. In some examples, method 700 is performed at a handheld electronic device that includes one or more light emitters and one or more light detectors.

Method 700 includes driving (702) the one or more light emitters, such light emitter 104b of FIG. 3A. Method 700 includes detecting (704) an amount of light via the one or more light detectors, such as PD 306 of FIG. 3A. Method 700 includes determining (706) that a first light emitter of the one or more light emitters is optically occluded by an object outside a housing of the handheld electronic device based on the amount of light detected via the first light detector, such as described with reference to FIGS. 4A and 5A.

In some examples, local optical occlusion detection circuitry determines local optical occlusion at a light emitter of an input device without driving light emitters on input device. In some examples, light detectors detect ambient light level, the captured light data is sent to the local optical occlusion detection circuitry. In some examples, the local optical occlusion detection circuitry compares amounts of ambient light detected via the light detectors, and in accordance with a determination that a light detector indicates a low ambient light level compared to amounts of ambient light detected via one or more other light detectors, the input device determines that a light emitter that is proximate to (e.g., in the same optical module as the light detector or within a threshold distance (e.g., 1 mm, 2 mm, 3 mm, 4 mm, 5 mm, 6 mm, 7 mm, 1 cm or another threshold distance) of the light detector) is local optically occluded. In some examples, the local optical occlusion detection circuitry can dynamically change amounts of power utilized by light emitters operating in the outside-in tracking mode based on ambient light level. For example, in accordance with a determination that amounts of ambient light detected by light detectors is a first amount, input device 100 optionally drives light emitters at a first duty cycle and/or intensity for spatial tracking, and in accordance with a determination that amounts of ambient light detected by light detectors is a second amount, greater than the first amount, input device 100 optionally drives light emitters at a second duty cycle and/or intensity for spatial tracking, higher than the first duty cycle and/or intensity for spatial tracking. Thus, input device can optionally optimize the light emitters operating in the outside-in tracking mode.

Therefore, according to the above, some examples of the disclosure are directed to a method. The method is optionally performed at a handheld electronic device that includes one or more light emitters and one or more light detectors. The method includes driving the one or more light emitters, detecting one or more amounts of light via the one or more light detectors, and determining that a first light emitter of the one or more light emitters is optically occluded by an object outside a housing of the handheld electronic device based on a first amount of light of the one or more amounts of light detected via a first light detector of the one or more light detectors. Additionally or alternatively, in some examples, the method includes driving the one or more light emitters, detecting one or more amounts of light via the one or more light detectors, and determining whether a first light emitter of the one or more light emitters is optically occluded by an object outside a housing of the handheld electronic device based on a first amount of light of the one or more amounts of light detected via a first light detector of the one or more light detectors, including in accordance with a determination that the first amount of light detected via the first light detector is above a threshold amount of light, determining that the first light emitter is optically occluded by the object outside the housing of the handheld electronic device, and in accordance with a determination that the first amount of light detected via the first light detector is below the threshold amount of light, determining that the first light emitter is not optically occluded by an object outside the housing of the handheld electronic device. Additionally or alternatively, in some examples, determining that the first light emitter is optically occluded by the object outside the housing of the handheld electronic device based on the first amount of light detected via the first light detector includes in accordance with the determination that the amount of light detected via the first light detector is above a threshold amount of light, determining that the first light emitter is optically occluded by the object outside the housing of the handheld electronic device. Additionally or alternatively, the threshold amount of light is based at least on amount of ambient light that is optionally detected by the one or more light detectors (e.g., before the one or more light detectors detect light from the one or more light emitters). Additionally or alternatively, in some examples, the method includes in response to determining that the first light emitter is optically occluded by the object outside the housing of the handheld electronic device, forgoing driving the first light emitter for spatial tracking of the handheld electronic device and/or a second light emitter, different from the first light emitter, for spatial tracking of the handheld electronic device. Additionally or alternatively, in some examples, driving the one or more light emitters includes driving the one or more light emitters with a first intensity or first duty cycle, and the method includes performing an operation with respect to the first light emitter that is determined to be optically occluded by the object outside the housing of the handheld electronic device, including driving the first light emitter with a second intensity or second duty cycle, different from the first intensity or first duty cycle (e.g., greater than the first intensity or first duty cycle). Additionally or alternatively, in some examples, the one or more light emitters are driven at a first intensity, and the first intensity of the one or more light emitters is based on an ambient light level detected by the one or more light detectors. Additionally or alternatively, in some examples, driving the one or more light emitters includes simultaneously driving the one or more light emitters. Additionally or alternatively, in some examples, the method includes estimating a pose of a hand in contact with the handheld electronic device based at least on one or more determined optically occluded light emitters, including the first light emitter that is determined to be optically occluded. Additionally or alternatively, in some examples, the method includes estimating a pose of a hand in contact with the handheld electronic device based at least on one or more non-optically occluded light emitters (e.g., light emitter(s) that are determined to not be optically occluded). Additionally or alternatively, in some examples, the one or more light emitters are driven at a first duty cycle or first intensity, and the method includes determining that the first light emitter is not optically occluded by the object or another object, different from the object, outside the housing of the handheld electronic device based on a second amount of light detected via the first light detector, and in response to determining that the first light emitter is not optically occluded, driving the first light emitter with a second duty cycle or second intensity, that is greater than the first duty cycle or first intensity. Some examples of the disclosure are directed to a non-transitory computer readable storage medium storing instructions configured to be executed by one or more processors of the system to cause the processor(s) to perform any of the above methods.

Some examples of the disclosure are directed to a handheld electronic device. The handheld electronic device can include one or more light emitters, one or more light detectors, and processing circuitry configured to drive the one or more light emitters, detect one or more amounts of light via the one or more light detectors, and determine that a first light emitter of the one or more light emitters is optically occluded by an object outside a housing of the handheld electronic device based on a first amount of light of the one or more amounts of light detected via a first light detector of the one or more light detectors. Additionally or alternatively, in some examples, the handheld electronic device includes a housing. The one or more light emitters are in or within the housing, and the housing is at least partially transparent to the one or more light wavelengths of the one or more light emitters. Additionally or alternatively, in some examples, the one or more light emitters and the one or more light detectors are equal in number. Additionally or alternatively, in some examples, the one or more light emitters and the one or more light detectors are unequal in number (e.g., the one or more light emitters are greater in number or less in number than the one or more light detectors). Additionally or alternatively, in some examples, the one or more light emitters and the one or more light detectors are in different optical modules and are connected by a flex circuit to a driving and sensing circuitry. Additionally or alternatively, in some examples, the one or more light emitters and the one or more light detectors are in a single optical module with the driving and sensing circuitry. Additionally or alternatively, in some examples, the handheld electronic device comprises one or more additional light emitters different from the one or more light emitters, and one or more additional light detectors different from the one or more light detectors. Additionally or alternatively, in some examples, the one or more additional light emitters and the one or more additional light detectors are configured to perform different driving and/or sensing functionality than the one or more light emitters and the one or more light detectors. For example, the one or more light emitters and the one or more light detectors are optionally used for spatial tracking while the one or more additional light emitters the one or more additional light detectors are optionally configured for proximity sensing or ranging, without including a mode in which they are configured for spatial tracking of the handheld electronic device and/or are not tuned for detecting near distance optical occlusions of light emitters (e.g., LEDs).

Some examples of the disclosure are directed to a system comprising a handheld electronic device including one or more light emitters, one or more light detectors, and processing circuitry configured to drive the one or more light emitters, detect one or more amounts of light via the one or more light detectors, and determine that a first light emitter of the one or more light emitters is optically occluded by an object outside a housing of the handheld electronic device based on a first amount of light of the one or more amounts of light detected via a first light detector of the one or more light detectors. The system optionally also comprises a second electronic device that is in communication with the handheld electronic device, the second electronic device including sensors including one or more sensors configured to detect a spatial location of the handheld electronic device relative to the second electronic device. Additionally or alternatively, in some examples, the second electronic device is configured to transmit the input to the handheld electronic device in response to the second electronic device detecting that the handheld electronic device is in contact with a hand of user. Additionally or alternatively, in some examples, the processing circuitry is configured to in response to determining that the first light emitter is optically occluded by the object outside the housing of the handheld electronic device, forgo driving the first light emitter for spatial tracking of the handheld electronic device and/or a second light emitter, different from the first light emitter, for spatial tracking of the handheld electronic device. Additionally or alternatively, in some examples, driving the one or more light emitters includes driving the one or more light emitters with a first intensity or first duty cycle, and the processing circuitry is configured to perform an operation with respect to the first light emitter that is determined to be optically occluded by the object outside the housing of the handheld electronic device, including driving the first light emitter with a second intensity or second duty cycle, different from the first intensity or first duty cycle.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A method comprising:
   at a handheld electronic device that includes one or more light emitters and one or more light detectors:
      driving the one or more light emitters;
      detecting one or more amounts of light via the one or more light detectors;
      determining that a first light emitter of the one or more light emitters is optically occluded by an object outside a housing of the handheld electronic device based on a first amount of light of the one or more amounts of light detected via a first light detector of the one or more light detectors; and while the first light emitter is determined to be optically occluded by the object outside the housing of the handheld electronic device, forgoing driving the first light emitter for spatial tracking of the handheld electronic device and/or a second light emitter, different from the first light emitter, for spatial tracking of the handheld electronic device.

2. The method of claim 1, wherein determining that the first light emitter is optically occluded by the object outside the housing of the handheld electronic device based on the first amount of light detected via the first light detector includes:

in accordance with the determination that the first amount of light detected via the first light detector is above a threshold amount of light, determining that the first light emitter is optically occluded by the object outside the housing of the handheld electronic device.

3. The method of claim 1, comprising:

while the first light emitter is determined to be optically occluded by the object outside the housing of the handheld electronic device, the object comprising a portion of a user contacting the housing or within a threshold distance of the housing, forgoing driving the first light emitter, and driving the second light emitter at a second intensity or second duty cycle that is greater than a first intensity or first duty cycle used prior to the determination that the first light emitter is optically occluded, for spatial tracking of the handheld electronic device.

4. The method of claim 1, wherein driving the one or more light emitters includes driving the one or more light emitters with a first intensity or first duty cycle, and wherein the method comprises:

performing an operation with respect to the first light emitter that is determined to be optically occluded by the object outside the housing of the handheld electronic device, including driving the first light emitter with a second intensity or second duty cycle, different from the first intensity or first duty cycle.

5. The method of claim 1, wherein the one or more light emitters are driven at a first intensity, and wherein the first intensity of the one or more light emitters is based on an ambient light level detected by the one or more light detectors.

6. The method of claim 1, wherein driving the one or more light emitters includes simultaneously driving the one or more light emitters.

7. The method of claim 1, comprising estimating a pose of a hand in contact with the handheld electronic device based at least on one or more determined optically occluded light emitters, including the first light emitter that is determined to be optically occluded.

8. The method of claim 1, wherein the one or more light emitters are driven at a first duty cycle or first intensity, and wherein the method comprises:

determining that the first light emitter is not optically occluded by the object or another object, different from the object, outside the housing of the handheld electronic device based on a second amount of light detected via the first light detector; and in response to determining that the first light emitter is not optically occluded, driving the first light emitter with a second duty cycle or second intensity, that is greater than the first duty cycle or first intensity.

9. A handheld electronic device, comprising:
one or more light emitters;
one or more light detectors; and
processing circuitry configured to:
drive the one or more light emitters;
detect one or more amounts of light via the one or more light detectors; and
determine that a first light emitter of the one or more light emitters is optically occluded by an object outside a housing of the handheld electronic device based on a first amount of light of the one or more amounts of light detected via a first light detector of the one or more light detectors; and
while the first light emitter is determined to be optically occluded by the object outside the housing of the handheld electronic device, forgo driving the first light emitter for spatial tracking of the handheld electronic device and/or a second light emitter, different from the first light emitter, for spatial tracking of the handheld electronic device.

10. The handheld electronic device of claim 9, comprising:
a housing, wherein the one or more light emitters are in or within the housing, and wherein the housing is at least partially transparent to one or more light wavelengths of the one or more light emitters.

11. The handheld electronic device of claim 9, wherein the one or more light emitters and the one or more light detectors are equal in number.

12. The handheld electronic device of claim 9, wherein the one or more light emitters and the one or more light detectors are unequal in number.

13. The handheld electronic device of claim 9, wherein the one or more light emitters and the one or more light detectors are in different optical modules and are connected by a flex circuit to a driving and sensing circuitry.

14. The handheld electronic device of claim 9, wherein the one or more light emitters and the one or more light detectors are in a single optical module with a driving and sensing circuitry.

15. The handheld electronic device of claim 9, comprising:
one or more additional light emitters different from the one or more light emitters; and
one or more additional light detectors different from the one or more light detectors;
wherein the one or more additional light emitters and the one or more additional light detectors are configured to perform different driving and/or sensing functionality than the one or more light emitters and the one or more light detectors.

16. A system comprising:
a handheld electronic device including:
one or more light emitters,
one or more light detectors, and
processing circuitry configured to:
drive the one or more light emitters;
detect one or more amounts of light via the one or more light detectors; and
determine that a first light emitter of the one or more light emitters is optically occluded by an object outside a housing of the handheld electronic device based on a first amount of light of the one or more amounts of light detected via a first light detector of the one or more light detectors;

while the first light emitter is determined to be optically occluded by the object outside the housing of the handheld electronic device, forgoing driving the first light emitter for spatial tracking of the handheld electronic device and/or a second light emitter, different from the first light emitter, for spatial tracking of the handheld electronic device; and a second electronic device that is in communication with the handheld electronic device, the second electronic device including sensors including one or more sensors configured to detect a spatial location of the handheld electronic device relative to the second electronic device, wherein the handheld electronic device is configured to drive the one or more light emitters in response to input from the second electronic device.

17. The system of claim 16, wherein the second electronic device is configured to transmit the input to the handheld electronic device in response to the second electronic device detecting that the handheld electronic device is in contact with a hand of user.

18. The system of claim 16, wherein the processing circuitry is configured to:

in response to determining that the first light emitter is optically occluded by the object outside the housing of the handheld electronic device:

forgo driving the first light emitter for spatial tracking of the handheld electronic device and/or the second light emitter for spatial tracking of the handheld electronic device.

19. The system of claim 16, wherein driving the one or more light emitters includes driving the one or more light emitters with a first intensity or first duty cycle, and wherein the processing circuitry is configured to:

perform an operation with respect to the first light emitter that is determined to be optically occluded by the object outside the housing of the handheld electronic device, including driving the first light emitter with a second intensity or second duty cycle, different from the first intensity or first duty cycle.

20. The system of claim 16, wherein the one or more light emitters are driven at a first intensity, and wherein the first intensity of the one or more light emitters is based on an ambient light level detected by the one or more light detectors.

21. The method of claim 1, where the object outside the housing of the handheld electronic device comprises a portion of a user contacting the housing or within a threshold distance of the housing.

* * * * *